Sept. 17, 1968          H. MILLER          3,401,549
FAILURE MONITOR FOR ATTITUDE REFERENCE SYSTEMS
Filed Aug. 9, 1966
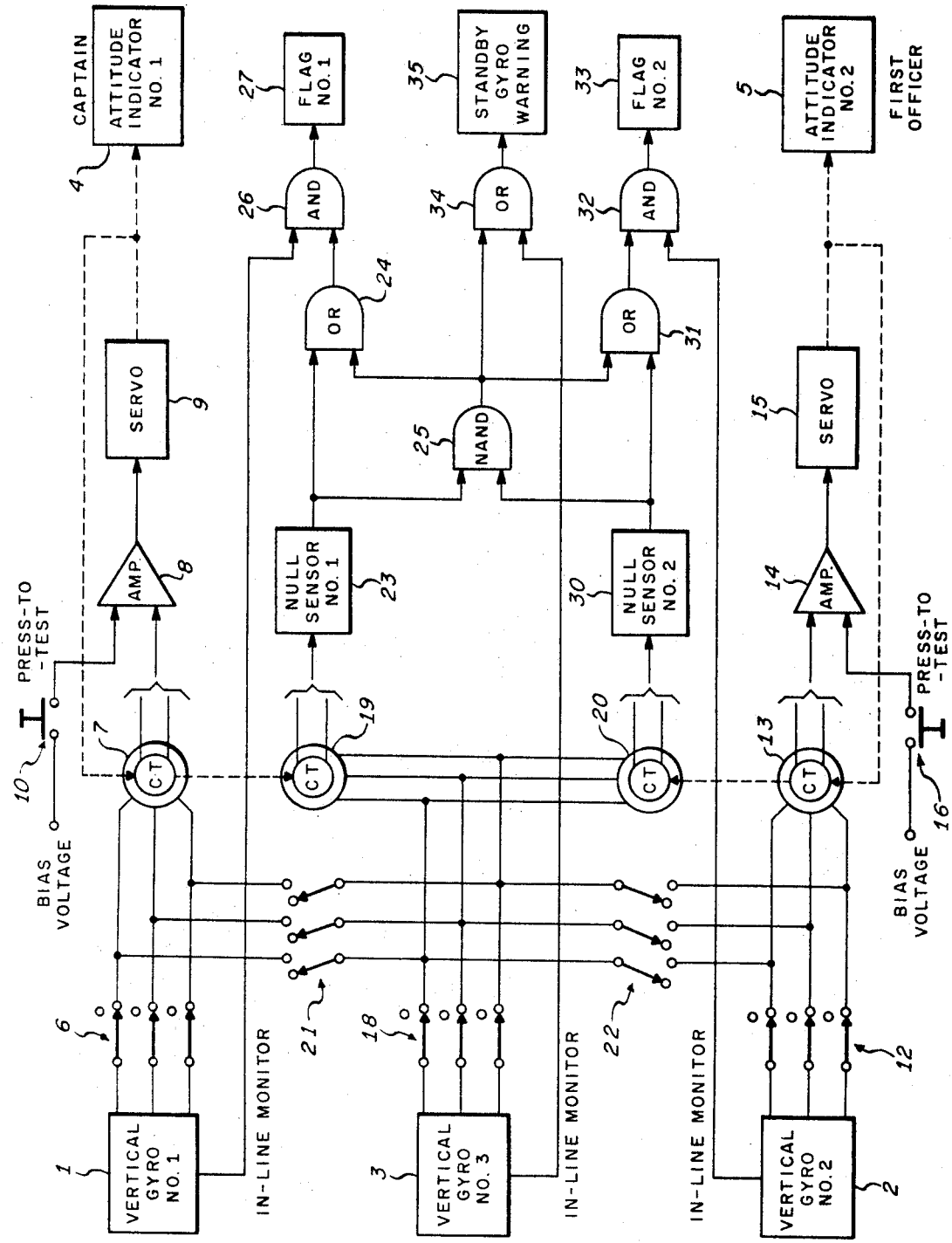
INVENTOR.
HARRY MILLER
BY
ATTORNEY

United States Patent Office

3,401,549
Patented Sept. 17, 1968

3,401,549
FAILURE MONITOR FOR ATTITUDE
REFERENCE SYSTEMS
Harry Miller, Scottsdale, Ariz., assignor to Sperry Rand
Corporation, a corporation of Delaware
Filed Aug. 9, 1966, Ser. No. 571,339
6 Claims. (Cl. 73—1)

This invention relates to monitoring apparatus for monitoring attitude reference systems and is particularly suitable for aircraft.

For aircraft to meet current Federal Aviation Agency (FAA) requirements for Category II operation, a system is required to monitor the attitude data presented to the pilot and copilot to insure in the event of a single failure in a plural system which occurs below 200 feet of altitude during an approach or takeoff that (1) a discrete warning is provided and (2) data is available to safely perform a go-around maneuver.

The FAA has previously approved a triply redundant system for Category II operation which involves the installation of three attitude indicators on the instrument panel. This solution is not considered desirable because the location and size of the third attitude indicator must, of necessity, be substandard. The reason for the requirement for the third attitude indicator evolves because no adequately monitored dual installation has heretofore been found acceptable.

The present invention utilizes three remote vertical gyroscopes but has only two attitude indicators mounted on the instrument panel. The third vertical gyroscope provides a reference for monitoring a dual attitude system and in addition functions as a spare which can be utilized in the event that one of the other vertical gyroscopes fail. In this event, the system of the present invention is still able to function as a dual attitude system with monitoring in accordance with the FAA requirements. The present invention therefore enjoys the following advantages:

(1) Requisite failure monitoring and assessment is achieved without the inherent location problems and expense of the third attitude instrument;

(2) The third vertical gyroscope performs both monitoring and standby functions;

(3) Dispatch of an aircraft from a minimum equipped station will be expedited since only two of the three vertical gyroscopes need be operational at takeoff if minimums are restricted to 200 feet; and (4) A press-to-test function exercises the flag warning circuitry.

It is therefore a primary object of the present invention to provide an attitude reference monitoring system which provides discrete monitoring functions of the system.

It is another object of the present invention to provide an attitude reference monitoring system having redundant channels which provides selective monitoring functions for the system.

It is an additional object of the present invention to provide an attitude reference monitoring system which provides discrete monitoring functions utilizing a plurality of primary reference sources without requiring a like plurality of indicating devices.

These and other objects of the present invention will become apparent by referring to the specification and drawing in which the single figure shows an electrical schematic diagram in block form of a failure monitoring system incorporating the present invention.

The present invention will be explained with respect to a vertical reference monitoring system in terms of pitch attitude; it being appreciated that the invention is equally applicable to monitoring other attitudes such as roll and yaw, of vehicles either individually or simultaneously.

Referring now to the drawing, three substantially identical vertical gyroscopes 1, 2 and 3 provide information representative of the pitch attitude of the aircraft upon which the gyroscopes 1, 2 and 3 are mounted. In normal operation, the pitch signals provided from the vertical gyros 1, 2 and 3 are substantially identical. The vertical gyro 1 is normally connected to provide pitch signals to the captain's attitude indicator 4 while the vertical gyro 2 is normally connected to provide pitch signals to the first officer's indicator 5. Specifically, the vertical gyro 1 has its pitch output signal connected through a switch 6 to the stator of a differential resolver synchro in the form of a control transformer 7. The rotor of the control transformer 7 is connected through an amplifier 8 to control a servomechanism 9. The servomechanism 9 drives the pitch attitude indicator of the captain's attitude indicator 4 and also drives, in feedback fashion, the rotor of the control transformer 7. To provide a press-to-test function, a bias voltage indicated by the legend is coupled through a press-to-test switch 10 to an input terminal of the amplifier 8.

In a similar manner, the vertical gyroscope 2 has its pitch output signal connected through a switch 12 to the stator of a control transformer 13 which has its rotor connected to an amplifier 14 that controls a servomechanism 15 which in turn drives the pitch attitude indicator of the first officer's attitude indicator 5. The servomechanism 15 also drives the rotor of the control transformer 13 in feedback fashion. A press-to-test function is provided by the press-to-test switch 16 which selectively couples a bias voltage indicator by the legend to the amplifier 14.

The vertical gyroscope 3 provides standby and monitoring functions and has its pitch output signal connected through normally closed switch 18 to the respective stators of monitoring control transformers 19 and 20. The pitch output signal via the switch 18 is also connected to normally open switches 21 and 22. When the switch 21 is in its closed position, it connects the vertical gyroscope 3 via switch 18 to the stator of the control transformer 7. In the closed position of the switch 22, the vertical gyroscope 3 is connected via switches 18 and 22 to the stator of the control transformer 13.

The rotor of the control transformer 19 is also driven by the output shaft of the servomechanism 9 in synchronism with the rotor of the control transformer 7. Similarly, the rotor of the control transformer 20 is driven by the output shaft of the servomechanism 15 in synchronism with the rotor of the control transformer 13. The rotor of the control transformer 19 is connected through a null sensor circuit 23 which in turn has its output connected to an OR circuit 24 and to a NAND circuit 25. The output of the OR circuit 24 is connected to an AND circuit 26 and thence to a warning flag 27. The in-line monitor signal from the vertical gyroscope 1 is connected to the other input terminal of the AND circuit 26. The presence of the in-line monitor signal from gyroscope 1 indicates normal operation while the absence of voltage is an indication of failure. The warning flag 27 is kept retracted out of view by the presence of both input voltages to the AND circuit 26.

In a similar manner, the rotor of the control transformer 20 is connected to a null sensor 30 which has its output connected to the other input terminal of the NAND circuit 25 and to an input terminal of an OR circuit 31. The output of the OR circuit 31 is connected through an AND circuit 32 to a warning flag 33. The in-line monitor signal from the vertical gyroscope 2 is connected to the other input terminal of the AND circuit 32. The presence of the in-line monitor signal from gyroscope 2 indicates normal operation while the absence of voltage is an indication of failure. The warning flag 33 is kept retracted out of view by the presence of both input voltages to the AND circuit 32.

The output of the NAND circuit 25 is connected to respective input terminals of OR circuits 24, 31 and 34. The other input terminal of the OR circuit 34 is responsive to the in-line monitor signal from the vertical gyroscope 3, the absence of the in-line monitor signal indicates normal operation while the presence of voltage indicates failure. The output of the OR circuit 34 is connected to a standby gyroscope warning light 35 which is energized when either input to the OR circuit 34 has voltage.

In normal operation, the switches are as shown with the switches 6, 12 and 18 closed and the switches 21 and 22 open. Normally, the vertical gyroscopes 1, 2 and 3 provide substantially identical pitch signals with the signals from the vertical gyroscopes 1 and 2 causing the servo mechanisms 9 and 15 to drive and quickly followup on any error signals indicated at the outputs of the control transformers 7 and 13, respectively. Thus, the outputs of the control transformers 7 and 13 and also the outputs of the monitoring control transformers 19 and 20 normally are at substantially null conditions within some tolerance. If the output signals from the monitoring control transformers 19 and 20 rise above a predetermined threshold, it is then indicative of a failure condition. The null sensors 23 and 30 are accordingly arranged to have an output when their voltage inputs from the respective control transformers 19 and 20 are below a predetermined preset voltage level. When the voltage level rises above the predetermined threshold, the output of the respective null sensor 23 or 30 goes to zero, thereby indicating a failure condition.

A failure of the vertical gyroscope 3 or of its three wire synchro data transmission lines is indicated if both null sensors 23 and 30 indicate a high null simultaneously. Under this condition, it is required that the flags 27 and 33 do not appear but that the standby gyro warning light 35 be energized. This is accomplished by means of the NAND circuit 25 which is responsive to the output from the null sensors 23 and 30 and provides an output to the OR circuit 34 to energize the warning light 35 when both null sensors 23 and 30 indicate a loss of voltage. Simultaneously, the output from the NAND circuit 25 inhibits the release of the flags 27 and 33 thereby keeping them out of sight via the OR circuit 24 and AND circuit 26 as well as the OR circuit 31 and the AND circuit 32 respectively. The vertical gyroscope 3 is rendered ineffective by opening the switch 18. Cross monitoring between channels of the vertical gyroscopes 1 and 2 can be achieved by closing either the switch 21 or the switch 22.

Assuming again that the switches are in their normal position as shown in the drawing, and now the vertical gyroscope 1 malfunctions. The output from the monitor control transformer 19 now exceeds the predetermined threshold set by the null sensor 23. The output of the null sensor 23 then goes to zero thereby providing zero input to one input terminal of the OR circuit 24 and to one input terminal of the NAND circuit 25. Since only one input circuit to the NAND circuit 25 has disappeared, its output will remain at zero thereby providing a zero input to the other input terminal of the OR circuit 24 and it then has a zero output. Therefore, the absence of an input voltage from the OR circuit 24 to the input of the AND circuit 26 allows the flag 27 to be released and to come into view to warn that the vertical gyroscope 1 has malfunctioned. Since the flag 33 is still retracted out of view, the malfunctioning vertical gyroscope 1 can then be effectively eliminated from the system by opening switch 6. By closing switch 21 the standby vertical gyroscope 3 will then operate the attitude indicator 4. The flag 27 will then retract out of view and a complete dual installation is available for the remainder of the flight.

If the flag 27 did not disappear when the standby vertical gyroscope 3 was substituted for vertical gyroscope 1, it would have indicated that the failure was in the attitude indicator 4 and not in the vertical gyroscope 1. In the event the failure is in the captain's indicator 4, that side of the cockpit could not be used for indicating attitude.

Similarly, in the event of a malfunction of the vertical gyroscope 2, the flag 33 would come into view until the switch 12 was opened and the switch 22 closed to provide attitude indications on the first officer's indicator 5 by means of the standby vertical gyroscope 3.

The press-to-test function checks the integrity of the monitor circuits by inserting a bias signal into the respective indicator servomechanism to cause it to be displaced from its proper position relative to that dictated by its respective vertical gyroscope. The respective null sensor detects the situation and causes the warning flag associated with it to appear. If both press-to-test functions are exercised simultaneously at both the captain's and first officer's sides of the cockpit, it will simulate failure of the standby and monitor vertical gyroscope 3 which results in the lighting of the standby gyro warning lamp 35. At this time the flags 27 and 33 do not appear in view.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In gyroscopic apparatus,
    (a) first, second and third substantially identical gyroscopic means for providing first, second and third substantially identical attitude signals respectively as well as first, second and third in-line monitoring signals, respectively, during normal operation,
    (b) first and second attitude indicating means,
    (c) first and second servo control means normally coupled between said first and second gyroscopic means and said first and second attitude indicating means respectively for providing redundant first and second attitude indicating channels,
    (d) first comparison means responsive effectively to said first and third attitude signals for providing a first comparison signal when the difference therebetween exceeds a first predetermined threshold,
    (e) second comparison means responsive effectively to said second and third attitude signals for providing a second comparison signal when the difference therebetween exceeds a second predetermined threshold, and
    (f) means including gating means responsive to said comparison signals and said in-line monitoring signals for providing discrete measures indicative of the malfunctioning portion of said apparatus.

2. Apparatus of the character recited in claim 1 further including first and second manually operable testing means coupled to said first and second servo control means, respectively, for selectively introducing into said first and second attitude indicating channels respective first and second test signals representative of first and second attitude signals, respectively, in excess of said first and second thresholds whereby discrete measures are indicated for testing portions of said apparatus.

3. Apparatus of the character recited in claim 1 further including switching means for rendering the malfunctioning gyroscopic means ineffective and for substituting another of said gyroscopic means for said malfunctioning gyroscopic means.

4. Apparatus of the character recited in claim 1 in which said first comparison means includes first synchro control transformer means having one portion responsive to said first attitude signal and another portion responsive to said third attitude signal for providing a first difference signal representative of the difference therebetween and said second comparison means includes second synchro control transformer means having one portion responsive to said second attitude signal and another portion responsive to said third attitude signal for providing a second difference signal representative of the difference therebetween.

5. Apparatus of the character recited in claim 4 in which said first and second comparison means further includes first and second null sensing means responsive to said first and second difference signals, respectively, for providing said first and second comparison signals respectively.

6. Apparatus of the character recited in claim 5 in which said means including gating means includes a NAND circuit responsive to said first and second comparison signals for providing a NAND signal, a first OR circuit responsive to said first comparison signal and said NAND signal for providing a first OR signal, a second OR circuit responsive to said second comparison signal and said NAND signal for providing a second OR signal, a third OR circuit responsive to said NAND signal and said third in-line monitoring signal for providing a third OR signal indicative of failure of said third gyroscopic means, a first AND circuit responsive to said first in-line monitoring signal and said first OR signal for providing an AND signal that is a measure representative of the failure of said first gyroscopic means, and a second AND circuit responsive to said second in-line monitoring signal and said second OR signal for providing a second AND signal that is a measure representative of the failure of said second gyroscopic means.

References Cited

UNITED STATES PATENTS

| 2,980,895 | 4/1961 | Luik | 340—421 |
| 3,112,644 | 12/1963 | Schroeder | 73—178 |
| 3,282,081 | 11/1966 | Boskovich | 73—1 |

FOREIGN PATENTS 204,146  11/1955  Australia.

S. CLEMENT SWISHER, *Primary Examiner.*